Oct. 26, 1948.   J. L. KING   2,452,199
WELDING ELECTRODE HOLDER
Filed April 18, 1946
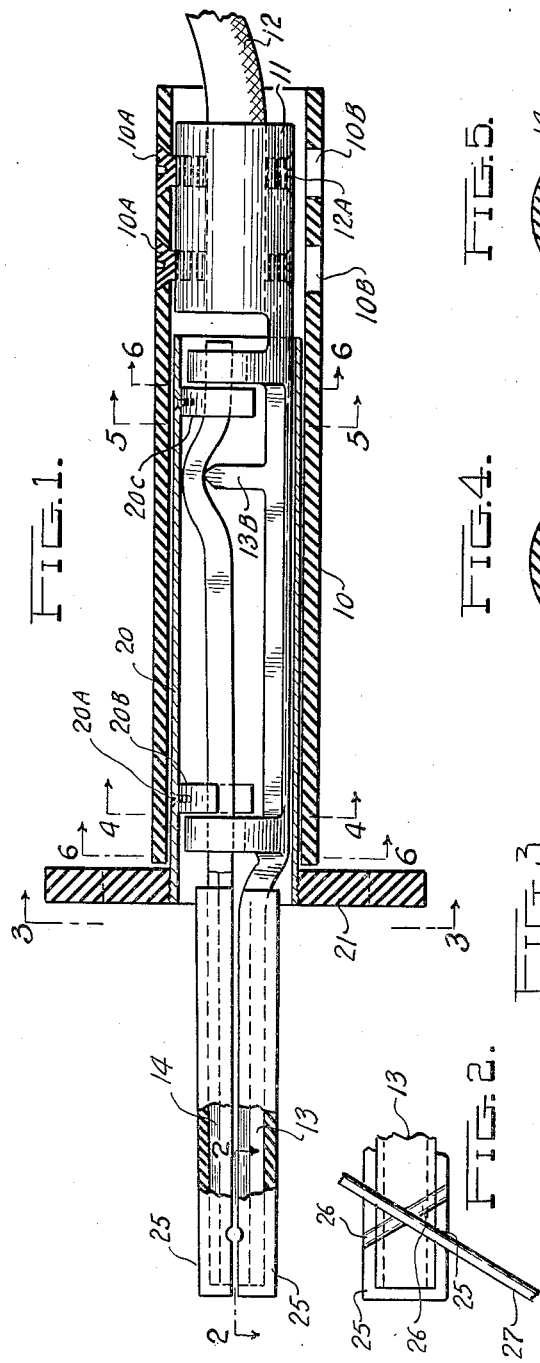
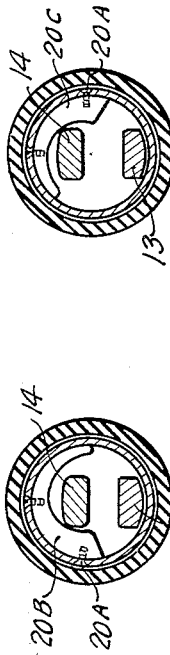
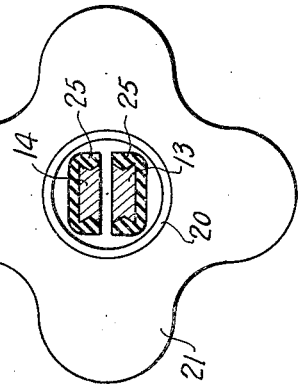
INVENTOR.
John L. King.
BY
Hunke & Hardesty
ATTORNEYS

Patented Oct. 26, 1948

2,452,199

UNITED STATES PATENT OFFICE 2,452,199

WELDING ELECTRODE HOLDER

John L. King, Detroit, Mich., assignor to Miracle Lubricating Company, Detroit, Mich., a corporation of Michigan Application April 18, 1946, Serial No. 663,129

7 Claims. (Cl. 219—8)

The present invention relates to holders for welding electrodes and has among its objects a holder of simple but efficient construction that will be of long life and easy and safe operation.

Another object is a holder which has no projecting parts, is easily operated to change electrodes, and holds the latter firmly and with no possibility of their becoming loose with rough handling.

Other objects and advantages will be apparent to those skilled in the art upon reference to the following description and the accompanying drawings in which Fig. 1 is a central longitudinal sectional view of a holder involving the present invention.

Fig. 2 is a section on line 2—2 of Fig. 1, showing a portion of an electrode.

Figs. 3 to 5 are sectional views on lines 3—3, 4—4, and 5—5, respectively, of Fig. 1.

Fig. 6 is a sectional view on either of the two lines 6—6 of Fig. 1.

As indicated in the drawing, the holder comprises a tubular handle 10 of insulating material within which is fixed as by screws 10A a socket member 11 adapted to receive the end of a supply line or current lead 12, this being secured in place by screws 12A accessible through suitable openings 10B in handle 10. The socket member 11 is fixed to or integral with a stationary jaw member 13 which extends from the member 11 in the rear end of the handle 10 a sufficient distance beyond the other end of the latter. Jaw member 13 is provided adjacent socket 11 and also at a point just within the other end of handle 10, with upstanding guide arms 13A (see Fig. 6), these being provided with inner parallel surfaces and with outer curved surfaces spaced from the inner wall of handle 10. Jaw member 13 is also provided at a short distance from socket 11, with an upstanding fulcrum 13B.

Cooperating with jaw member 13 is a second jaw member 14 mounted loosely within handle 10 between the guide arms 13A and extending from adjacent socket member 11 to the outer end of jaw 13, being bent upwardly to pass over and rest upon the fulcrum 13B.

Telescoped into handle 10 is a second tubular member 20 carrying at its outer end a shield 21, the tube 20 being of metal and the shield of insulating material.

The shield 21 is preferably in the shape of a quatrefoil, or it may be of any suitable shape, to aid rotation of the tube 20 and prevent rolling on a flat surface.

Inside the tube 20 are fixed as by welding or screws 20A a pair of cams 20B and 20C which may be identical but which are oppositely arranged so that as the tube 20 is rotated, or partially so, the cams will act oppositely.

The two cams are so located that they contact and act upon the handle-enclosed portion of jaw member 14, the cam 20B acting upon that portion of the jaw member adjacent the forward end of handle 10 and the cam 20C acting upon jaw member 14 at or adjacent to the rear end. The cam 20B will, therefore, be at a much greater distance from fulcrum 13B than cam 20C. The two cams are so positioned circumferentially of tube 20 that neither will interfere with the action of the other.

It is preferred to make the jaw members 13 and 14 of copper or suitable alloy and to stiffen the projecting portions with steel channel members 25 as indicated in Figs. 1, 2 and 3 and provide their opposing faces with diagonal semicircular or other shaped grooves 26 for gripping the electrode 27.

In the operation of the handle to fix in position an electrode, or to change electrodes a partial rotation of shield 21 and the tube 20 causes cam 20C to open jaws 13 and 14, while partial rotation in the opposite direction will release cam 20C and cause cam 20B to close the jaws. And, since the cam 20B is much farther from the fulcrum, the closing pressure will be several times that exerted in the opening operation.

Now having described the invention and the preferred embodiment thereof, it is to be understood that said invention is to be limited, not to the specific details herein set forth, but only by the scope of the claims which follow.

I claim:

1. A welding electrode holder consisting of a handle portion having fixed therein a member extending therethrough and projecting from one end thereof, said projecting end constituting an electrode holding jaw, a cooperating jaw member having a portion extending into said handle in parallel relation with the handle enclosed portion of the first member, a fulcrum for the second member located adjacent the inner end of the same, means adapted to act upon the thus constituted lever on one side of said fulcrum to swing said lever to bring said jaws together, other means adapted to act on said lever on the other side of said fulcrum to separate said jaws, a single element for positively actuating both of said means, and means for fixing a current supply lead to one of said jaw members.

2. In a welding electrode holder, a pair of members provided at their forward ends with electrode holding jaws, a handle into which the rearward portions of said members extend, a fulcrum between said members adjacent their rearward ends, a cam located adjacent said fulcrum for acting on said members to swing open said jaws and a second cam located at a distance from said fulcrum and adapted to act on said members to swing closed said jaws.

3. In a welding electrode holder, a longitudinally extending member having at one end means for affixing a current supply lead and at its other end a jaw formation, said member being provided at an intermediate portion adjacent said affixing means with means constituting a fulcrum, a second longitudinally extending member provided at one end with a jaw formation adapted to cooperate with the first jaw formation to hold an electrode, and extending in parallel relation with the first member to beyond said fulcrum and resting on the latter, thereby constituting a lever, a tubular handle enclosing said affixing means and the said intermediate portion of the first member together with the adjacent portion of the second member, a tubular element telescoped in said handle and surrounding said members, and means carried by said tubular element and adapted to swing said lever on said fulcrum when said tubular element is moved relatively to said handle.

4. In a welding electrode holder, a longitudinally extending member having at one end means for affixing a current supply lead and at its other end a jaw formation, said member being provided at an intermediate portion adjacent said affixing means with means constituting a fulcrum, a second longitudinally extending member provided at one end with a jaw formation adapted to cooperate with the first jaw formation to hold an electrode, and extending in parallel relation with the first first member to beyond said fulcrum and resting on the latter, thereby constituting a lever, a tubular handle enclosing said affixing means and the said intermediate portion of the first member together with the adjacent portion of the second member, a tubular element telescoped in said handle and surrounding said members, a pair of oppositely arranged and alternately acting cams carried by said tubular element and arranged to act upon and move the arms of said lever when said tubular element is rotated whereby to open or close said jaws the rotation of said tubular element in one direction causing the closing of said jaws.

5. In a welding electrode holder, a longitudinally extending member having at one end means for affixing a current supply lead and at its other end a jaw formation, said member being provided at an intermediate portion adjacent said affixing means with means constituting a fulcrum, a second longitudinally extending member provided at one end with a jaw formation adapted to cooperate with the first jaw formation to hold an electrode, and extending in parallel relation with the first member to beyond said fulcrum and resting on the latter, thereby constituting a lever, a tubular handle enclosing said affixing means and the said intermediate portion of the first member together with the adjacent portion of the second member, a tubular element telescoped in said handle and surrounding said members, a pair of oppositely arranged and alternately acting cams carried by said tubular element and arranged to act upon and move the arms of said lever when said tubular element is rotated whereby to open or close said jaws, the opening cam being located closer to the fulcrum than the closing cam the rotation of said tubular element in one direction causing the closing of said jaws.

6. In a welding electrode holder a pair of jaw carrying members one of which is fulcrumed on the other, a tubular handle, a second tube telescoped into said handle and surrounding the fulcrum and adjacent portions of said members, means whereby said second tube may be rotated relative to said handle, means carried by said second tube for swinging the fulcrumed member on its fulcrum during said rotation and means for preventing rotation of said members with said second tube.

7. In a welding electrode holder a pair of jaw carrying members, one of which is fulcrumed on the other, a tubular handle, a second tube telescoped into said handle and surrounding the fulcrum and adjacent portions of said members, means whereby said second tube may be rotated relative to said handle, means carried by said second tube for swinging the fulcrumed member on its fulcrum during said rotation and means for preventing rotation of said members with said second tube, said second tube-carried means constructed and arranged to swing the fulcrumed member in one direction upon rotation of the second tube on one direction and to swing said fulcrumed member in the other direction when the second tube is rotated in the other direction.

JOHN L. KING.

REFERENCES CITED

The following references are of record in the file of this patent:

UNITED STATES PATENTS

| Number | Name | Date |
| --- | --- | --- |
| 1,842,627 | Ross | Jan. 26, 1932 |
| 2,067,995 | Varner et al. | Jan. 19, 1937 |
| 2,374,421 | Clyburn | Apr. 24, 1945 |
| 2,394,204 | Randall | Feb. 5, 1946 |